Aug. 21, 1956 MASAO SAKAMOTO 2,760,148

MAGNETIC AMPLIFIER

Filed March 26, 1953

INVENTOR.
MASAO SAKAMOTO
BY
George H Fisher
ATTORNEY

United States Patent Office 2,760,148

Patented Aug. 21, 1956

2,760,148

MAGNETIC AMPLIFIER

Masao Sakamoto, Minneapolis, Minn., assignor to Minneapolis-Honeywell Regulator Company, Minneapolis, Minn., a corporation of Delaware Application March 26, 1953, Serial No. 344,747

9 Claims. (Cl. 323—89)

Figure 1:
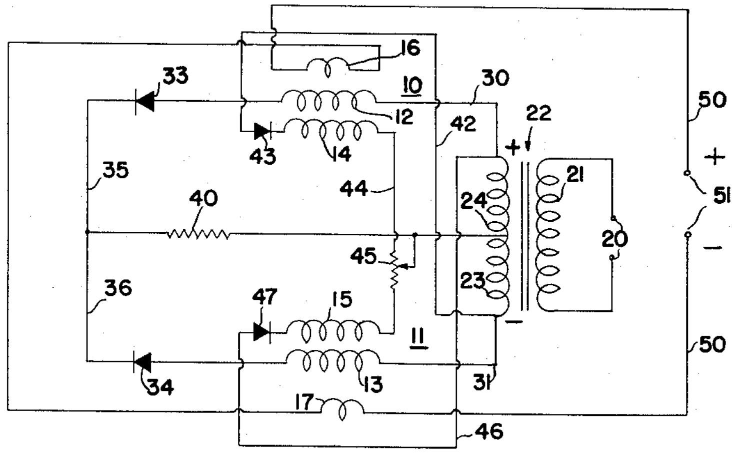

My invention relates to magnetic amplifiers and more particularly to an improved magnetic amplifier having a half wave output and an alternating current signal input.

Amplifiers of this general type are characterized by the fact that one half cycle of the exciting alternating current supply is used for presetting flux level in each of the cores of the amplifier while the other half cycle uses it for power output through a power winding of the device. During the power output, the difference in time of conduction in each half of the amplifier results in a net differential output. However, the conduction of one half of the amplifier affects the conduction of the other half of the amplifier in such manner that an inter-action or feedback takes place thereby limiting or prohibiting complete conduction during the half cycle of power during which each magnetic power winding is conducted. In my improved magnetic amplifier which utilizes a power winding together with a presetting of magnetizing winding and a conventional control winding a circuitry has been provided such that conduction of one half of the amplifier takes place during one half cycle from the alternating current power source and in the other half of the amplifier conduction takes place during the remaining half cycle of the alternating current power source thereby eliminating inter-action between the parts or half of the amplifier.

It is therefore an object of this invention to provide an improved magnetic amplifier circuit. It is further an object of this invention to provide in an improved magnetic amplifier circuit an arrangement in which inter-action between halves of the amplifier is eliminated and sensitivity of response together with amplification is greatly improved.

Figure 2:
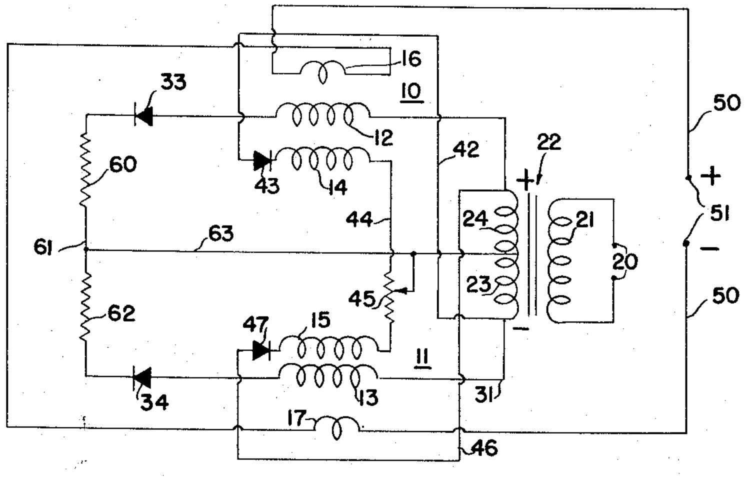

These and other objects of this invention will become apparent from the reading of the attached description together with the drawing wherein:

Figure 1 is a schematic circuit disclosure of the improved magnetic amplifier with one load consumption arrangement, and Figure 2 is a second schematic circuit of the same magnetic amplifier with a different load consumption circuit.

My improved magnetic amplifier is shown schematically in Figure 1 in electrical circuitry only. It will be understood that the amplifier is composed of two reactors or cores which are not shown but are indicated generally by the numerals 10 and 11, each having a power winding 12 and 13 respectively, a biasing or presetting winding 14 and 15 respectively and a control winding 16 and 17 respectively, mounted on the respective core in magnetic association therewith. The magnetic cores may be of any conventional type such as a toroid in which case the windings on each core will be toroidal in form or if other core configurations are utilized, the windings may be of the preformed spool type. This magnetic amplifier circuit is adapted to be energized from an alternating current source of power indicated generally at 20 and shown herein as connected to a primary 21 of a transformer 22 having a secondary winding 23 with a center tap as at 24. The power windings 12 and 13 are connected by conductors 30, 31 respectively to the extremities of the secondary winding 23 and through the power windings to half wave rectifiers or unidirectional conducting devices 33, 34 to conductors 35 and 36 respectively. A load or load consumption circuit is shown generally at 40 which connects to a common connection of the conductors 35, 36 at one extremity and to the center tap 24 of transformer secondary 23 completing the energizing circuit for the load and power windings. Biasing winding 14 of reactor 10 is conducted by a conductor 42 to an extremity of the secondary winding 23 opposite that to which the associated power winding 12 of reactor 10 is connected and through conductor 42 to a half wave rectifier 43 or unidirectional conducting device to the biasing or magnetizing winding 14, the circuit being completed through a conductor 44, potentiometer 45, to the center tap 24 of secondary winding 23. Similarly the biasing winding 15 of reactor 11 is connected by conductor 46 to the extremity of secondary winding 23 opposite that to which the power winding 13 is connected and from the conductor 46 to a half wave rectifier 47, biasing winding 15, potentiometer or voltage divider 45 to the tap 24 secondary winding 23. The control windings 16 and 17 of reactors 10 and 11 are connected in a series circuit indicated generally at 50 to an alternating type signal source 51.

Assuming the instantaneous polarities shown in Figure 1 of the power supply 20 and signal source 51, the reactor designated 10 will be conducting, that is its power winding 12 will experience a current flow therethrough into the rectifier 33, load 40 and to the center tap 24 of the energizing source. The reactor designated number 11 will not conduct during this half cycle, that is its power winding 13 will not experience a current flow therethrough due to the connection of the rectifier 34 in the circuitry. Current will flow through the magnetizing or presetting winding 15 by virtue of its connection to the secondary 23 of transformer 22 and the direction of connection of the rectifier 47 and this current flow will preset or magnetize the flux level of the reactor or core 11 to a predetermined value. Simultaneously, a current will flow through the winding 17 as well as winding 16 in the series circuit 50 from the alternating signal source and the current flow through the control winding 17 will be in the same direction with respect to the core as is that of a magnetizing winding 15 such as to aid the magnetomotive force developed by the magnetizing winding. The net result of this magnetization is the presetting of the flux level in the reactor side 11 to a predetermined point or level which it will be later noted will not permit the power winding 13 to conduct current of any quantity to the resistance load 40. At the same time it will be noted that with this particular instantaneous polarity, no current will flow to the biasing or magnetizing windings 14 due to the connection of this winding to the secondary 23 and transformer 22. The current flow to control winding 16 of reactor 10 while opposing the direction of magnetization of the current flow to the power winding 12 actually has no effect on the output of the reactor 10 during its conducting half cycle. After the reversal of polarity of the alternating current supply 20 and alternating signal source 51, the conduction period for the reactor 11 exists. The power winding 13, however, that does not conduct as noted above since the flux level of the reactor 11 has been preset to a point during the preceding half cycle as a result of which the power winding is capable of absorbing all of the applied voltage thereto. The power winding 12 during this half cycle cannot conduct due to the polarity of the power source. Current however does flow through the magnetizing or biasing winding 14 as well as current flow in winding 16, to preset or magnetize the core or reactor 10 to a predetermined figure or level. During the previous half cycle it was noted that the magnetomotive force due to the control winding 17 aided that due to the magnetizing winding 15. It should be noted that the magnetomotive force due to the control winding 16 opposes the magnetomotive force due to the magnetizing winding 14 during this half cycle and presets core 10 to a different level of magnetization than that to which core 11 was previously set. With the next half cycle or reversal of the power and signal source polarities, power winding 12 of reactor 10 saturates quickly because of the presetting of the magnetization of reactor 10 to the level referred to above and causes the applied voltage to be applied to the load with the winding 14 conducting. Simultaneously the flux level in the reactor 11 is preset and the cycling which was discussed above, reoccurs. It will be seen from the above description, that during one half cycle of the power supply the conducting period for the upper side or reactor 10 exists and at the same time a flux presetting period for the opposite side or reactor 11 exists. During the following half cycle the conduction period for the reactor 11 exists and the flux presetting period for the reactor 10 exists. However, because of the polarity of the signal source 51, the magnetization due to the signal windings will cause the output of one side of the amplifier to increase over its quiescent value and cause the output of the other half of the amplifier to reduce below its quiescent value, the magnitude of the changes in output being dependent upon the amplitude of the signal. Reversal of phase of the signal source will cause a reversal in the direction or change of the output of each half of the amplifier, as will be noted hereinafter. Since the conduction of the halves of the amplifier does not occur in the same half cycle of the power supply inter-action between the halves or reactors 10 and 11 is eliminated.

With the reversal of the phase of the source 51 applied to the windings 16 and 17 with respect to the power source 20 or supply, the output of the reactor 10 may be reduced to a minimum and the output of reactor 11 increased to a maximum or a reversal of the condition referred to above in which reactor 10 predominated and reactor 11 did not conduct to any substantial extent. Potentiometer 45 is utilized in the energization circuit for the biasing or magnetizing winding 15 to adjust the baising level between the halves of the amplifier or between the reactors 10 and 11 for balance purposes. The output impressed on the load 40 will be a pulsating signal, half wave in form, the phase of which will be reversed with a reversal of the polarity of the signal source 51. Similarly the magnitude of this signal will vary with the magnitude of the input signal source 51.

In the foregoing description, no particular reference has been made to the type of magnetic core material to be used in the magnetic core structures. I have found that magnetic materials having a rectangular hysteresis loops are preferred for optimum results. With rectangular loop materials, the circuits shown in Figures 1 and 2 will function properly. When rounded knee low coercive force materials are used, the back leakage of rectifiers 33 and 34 may be sufficient to reduce the output of each half of the amplifier to a minimum at zero signal. In such an event the connections to windings 14 and 15 in their respective biasing circuits should be reversed such that the respective biasing winding will aid where it previously opposed magnetization of the respective core and conversely, oppose where it previously aided.

The embodiment shown in Figure 2 of the circuitry disclosed therein is substantially the same as that in Figure 1 except for the location of the load circuit. Consequently the same numbering is used to identify similar parts. In this embodiment, the power circuit for the power windings 12 and 13 of reactors 10 and 11 is connected to the half wave rectifiers 33, 34 respectively and then to individual load devices or elements indicated at 60 and 62 with a common connection 61 therebetween. This power circuit is then completed by means of a conductor 63 connected to the common conductor 61 and to the center tap 24 of the secondary winding 23 of transformer 22. In this embodiment, the individual load devices or elements 60, 62 have a pulsating load current applied thereto but one or the other of the load devices 60, 62 will be energized depending upon the phase of the input signal 51. It will thus be seen that with the arrangement of Figures 1 and 2, this half wave amplifier design may be utilized to energize alternating current devices or direct current devices depending upon the connection of the load consumption circuit to the power circuitry of the reactors. The operation of and connection of the biasing windings 14, 15 and control windings 16, 17 remain the same, and the device responds in the manner described above for the presetting of the respective cores of reactors 10 and 11 on one alternate half cycle of power and conduction of current to the respective power winding on the next succeeding half cycle of the alternating power supply. Depending upon the phase of the input signal, one or the other halves or reactors will conduct to energize the load circuit.

In considering this invention it should be kept in mind that the present disclosure is intended to be illustrative only and that the scope of the invention is to be determined only by the appended claims.

I claim as my invention:

1. In a half wave magnetic amplifier, a pair of magnetic cores each with a single magnetic path and each having a power winding, a biasing winding and a control winding mounted thereon, an A. C. power supply including a transformer having a tapped secondary winding, circuit means including a pair of rectifiers connecting said power windings respectively to opposite extremities of said secondary winding and through a load consumption circuit to the center tap of said secondary winding, additional circuit means including a pair of rectifiers connecting said biasing windings respectively to opposite extremities of said secondary winding and opposite to the extremities of said secondary winding to which the respective power winding on the same magnetic core is attached being completed to the center tap of said secondary winding, and control circuit means connecting said control windings in series relation across an alternating type signal source.

2. In a half wave magnetic amplifier, a pair of magnetic cores each with a single magnetic path and each having a power winding, a biasing winding and a control winding mounted thereon, an A. C. power supply including a transformer having a tapped secondary winding, circuit means including a pair of rectifiers connecting said power windings respectively to opposite extremities of said secondary winding and through a common load consumption circuit to the center tap of said secondary winding, additional circuit means including a pair of rectifiers connecting said biasing windings respectively to opposite extremities of said secondary winding and opposite to the extremities of said secondary winding to which the respective power winding on the same magnetic core is attached being completed to the center tap of said secondary winding, and control circuit means connecting said control windings in series relation across an alternating type signal source.

3. In a half wave magnetic amplifier, a pair of magnetic cores each with a single magnetic path and each having a power winding, a biasing winding and a control winding mounted thereon, an A. C. power supply including a transformer having a tapped secondary winding, circuit means including a pair of rectifiers connecting said power windings respectively to opposite extremities of said secondary winding and through separate load consumption circuit to the center tap of said secondary winding, additional circuit means including a pair of rectifiers connecting said biasing windings respectively to opposite extremities of said secondary winding and opposite to the extremities of said secondary winding to which the respective power winding on the same magnetic core is attached being completed to the center tap of said secondary winding, and control circuit means connecting said control windings in series relation across an alternating type signal source.

4. In a half wave magnetic amplifier, a pair of magnetic cores each with a single magnetic path and each having a power winding, a biasing winding and a control winding mounted thereon, an A. C. power supply including a transformer having a tapped secondary winding, circuit means including a pair of rectifiers connecting said power windings respectively to opposite extremities of said secondary winding into a load consumption circuit to the center top of said secondary winding, additional circuit means including a pair of rectifiers connecting said biasing windings respectively to opposite extremities of said secondary winding and opposite to the extremities of said secondary winding to which the respective power winding on the same magnetic core is attached being completed to the center tap of said secondary winding to energize said biasing windings respectively with half cycles of supply current which are alternate that which flows in the associated power windings to preset said respective magnetic cores on alternate half cycles of supply, and control circuit means connecting said control windings in series relation across an alternating type signal source.

5. In a half wave magnetic amplifier, an alternating current supply, a pair of magnetic cores each with a single magnetic path and each having a power winding, a biasing winding and a control winding mounted thereon, circuit means connecting said power windings of said magnetic cores to an alternating current supply such that current flows in the respective power windings on alternate half cycles of the supply current, additional circuit means connecting said biasing windings to opposite sides of the alternating current supply such that current flows in said biasing windings on alternate half cycles which are opposite the current flow through the associated power winding on the same magnetic core and in such a direction as to magnetize the respective magnetic core in a direction opposite to the magnetization generated by the current flow through the associated power winding, and control circuit means connecting said control windings in an alternating signal source which is variable in phase and magnitude, said first named circuit means including a load consumption circuit.

6. In a half wave magnetic amplifier, an alternating current supply, a pair of magnetic cores each with a single magnetic path and each having a power winding, a biasing winding and a control winding mounted thereon, circuit means connecting said power windings of said magnetic cores to an alternating current supply such that current flows in the respective power windings on alternate half cycles of the supply current, additional circuit means connecting said biasing windings to opposite sides of the alternating current supply such that current flows in said biasing windings on alternate half cycles which are opposite the current flow through the associated power windings on the same magnetic core and in such a direction as to magnetize the respective magnetic core in a direction opposite to the magnetization generated by the current flow through the associated power winding, and control circuit means connecting said control windings in an alternating signal source which is variable in phase and magnitude, said first named circuit means including a load device adapted to be energized upon alternate half cycles of the supply current from said power windings.

7. In a half wave magnetic amplifier, a pair of magnetic cores each with a single magnetic path and each having a power winding, a biasing winding, and a control winding mounted thereon, circuit means connecting said power windings of said magnetic cores to an alternating current supply such that current flows in the respective power windings on alternate half cycles of the supply current, additional circuit means connecting said biasing windings to opposite sides of the alternating current supply such that current flows in said biasing windings on alternate half cycles which are opposite the current flow through the associated power winding on the same magnetic core and in such a direction as to magnetize the respective magnetic core in a direction opposite to the magnetization generated by the current flow through the associated power winding, and control circuit means connecting said control windings in an alternating signal source which is variable in phase and magnitude, said first named circuit means being adapted to energize separate load devices respectively from said power windings.

8. A half wave magnetic amplifier for controlling the current flow through a load consumption circuit comprising, a pair of magnetic reactors each having a single magnetic path and each having a load winding thereon, circuit means including unidirectional current conducting devices connecting each of said load windings to an alternating current source in such a manner that said load windings are respectively energized by a unidirectional current flow on alternate half cycles of said supply, said circuit means being connected to said load consumption circuit to energize same, a magnetizing winding and a control winding mounted on each reactor, circuit means connecting said magnetizing windings to opposite sides of said supply such that current flows in each of said magnetizing windings during half cycles of said supply when no current flow is present in said load winding on the same reactor, and circuit means adapted to be connected to an alternating signal source of variable phase and magnitude and connected to said control windings such that said control windings are simultaneously energized.

9. A half wave magnetic amplifier for controlling the current flow through a load consumption circuit comprising, a pair of magnetic reactors each having a single magnetic path and each having a load winding thereon, circuit means including unidirectional current conducting devices connecting each of said load windings to an alternating current source in such a manner that said load windings are respectively energized by a unidirectional current flow on alternate half cycles of said supply, said circuit means being connected to said load consumption circuit to energize same, a magnetizing winding and a control winding mounted on each reactor, circuit means including a unidirectional current conducting device connecting each of said magnetizing windings to opposite sides of said supply in such a manner that current will flow in each of said magnetizing windings during alternate half cycle of said supply when no current flows in said load winding on the same reactor to preset the magnetization of its respective reactor, and circuit means adapted to be connected to an alternating current signal source of variable phase and magnitude and connected to said control winding such that said control windings are simultaneously energized to modify the magnetization of said magnetizing winding for its respective reactor.

References Cited in the file of this patent

UNITED STATES PATENTS

| | | |
|---|---|---|
| 2,617,090 | Ogle | Nov. 4, 1952 |
| 2,677,796 | Geyger | May 4, 1954 |

OTHER REFERENCES

A. I. E. E. Miscellaneous Paper 50–93 on Magnetic Amplifiers by W. A. Geyger, December 1949.

"Feedback in Magnetic Amplifiers," by Fitzgerald, from "Electrical Communication," vol. 27, issue 4, December 1950, pages 298–319.